United States Patent
Lee et al.

(10) Patent No.: US 9,958,591 B2
(45) Date of Patent: May 1, 2018

(54) BACKLIGHT MODULE

(71) Applicants: Chien-Hui Lee, Hsin-Chu (TW);
Min-Chun Chou, Hsin-Chu (TW);
Ming-Dah Liu, Hsin-Chu (TW);
Ching-Hsiang Li, Hsin-Chu (TW);
Chang-Cheng Liu, Hsin-Chu (TW);
Wen-Yen Chiu, Hsin-Chu (TW)

(72) Inventors: Chien-Hui Lee, Hsin-Chu (TW);
Min-Chun Chou, Hsin-Chu (TW);
Ming-Dah Liu, Hsin-Chu (TW);
Ching-Hsiang Li, Hsin-Chu (TW);
Chang-Cheng Liu, Hsin-Chu (TW);
Wen-Yen Chiu, Hsin-Chu (TW)

(73) Assignee: Young Lighting Technology Inc., Hsin-Chu (TW)

(*) Notice: Subject to any disclaimer, the term of this patent is extended or adjusted under 35 U.S.C. 154(b) by 557 days.

(21) Appl. No.: 14/611,284

(22) Filed: Feb. 2, 2015

(65) Prior Publication Data

US 2015/0226901 A1    Aug. 13, 2015

(30) Foreign Application Priority Data

Feb. 13, 2014  (CN) .......................... 2014 1 0049862

(51) Int. Cl.
*F21V 8/00*    (2006.01)
(52) U.S. Cl.
CPC .......... *G02B 6/0036* (2013.01); *G02B 6/0051* (2013.01); *G02B 6/0053* (2013.01)
(58) Field of Classification Search
CPC .................................................. G02B 6/0036
See application file for complete search history.

(56) References Cited

U.S. PATENT DOCUMENTS

| 6,454,452 B1* | 9/2002 | Sasagawa | ............ G02B 6/0061 |
|---|---|---|---|
| | | | 349/65 |
| 2005/0122591 A1* | 6/2005 | Parker | ....................... F21V 5/00 |
| | | | 359/619 |

(Continued)

FOREIGN PATENT DOCUMENTS

| CN | 1737660 | 2/2006 |
|---|---|---|
| CN | 1918428 | 2/2007 |

(Continued)

OTHER PUBLICATIONS

"Office Action of China Counterpart Application", dated Jul. 25, 2016, p. 1-p. 9.

*Primary Examiner* — Andrew Coughlin
(74) *Attorney, Agent, or Firm* — JCIPRNET (57) ABSTRACT

A backlight module includes a light guide plate having a bottom surface, a light emitting surface, a first light incident surface, and microstructures. Each microstructure recesses into or protrudes from the bottom surface and has a first and a second surfaces. The first and the second surfaces of at least one of the microstructures are located on two sides of a first reference plane parallel to the first light incident surface. A section-line of each first surface on a second reference plane perpendicular to the first light incident surface and perpendicular to the light emitting surface is a straight line. A first angle between each first surface and a third reference plane parallel to the light emitting surface in the light guide plate is between 0 degrees and 20 degrees, and a thickness of each microstructure is between 0 micrometers and 20 micrometers.

21 Claims, 10 Drawing Sheets

(56) References Cited

U.S. PATENT DOCUMENTS

2011/0241573 A1* 10/2011 Tsai .................... G02B 6/0036
            315/312
2013/0286679 A1* 10/2013 Chen ................... G02B 6/0053
            362/607

FOREIGN PATENT DOCUMENTS

| CN | 101126859 | 2/2008 |
|----|-----------|--------|
| CN | 102681083 | 9/2012 |
| CN | 103375741 | 10/2013 |
| JP | 2007329007 | 12/2007 |
| TW | M264503 | 5/2005 |
| TW | M264504 | 5/2005 |
| TW | I296694 | 5/2008 |
| TW | I301920 | 10/2008 |
| TW | I375822 | 11/2012 |
| TW | 201339703 | 10/2013 |
| TW | 201344307 | 11/2013 |

* cited by examiner

BACKLIGHT MODULE

CROSS-REFERENCE TO RELATED APPLICATION

This application claims the priority benefit of China application serial no. 201410049862.3, filed on Feb. 13, 2014. The entirety of the above-mentioned patent application is hereby incorporated by reference herein and made a part of this specification.

BACKGROUND OF THE INVENTION

Field of the Invention

The invention relates to a backlight module, and more particularly, to a backlight module suitable for a display apparatus.

Description of Related Art

With the development of display techniques, flat panel displays have replaced the traditional cathode ray tube (CRT) and become the mainstream of displays. Among flat panel displays, liquid crystal displays (LCD) are the most common. In general, LCDs mainly can be formed by a backlight module and a liquid crystal panel. Since the liquid crystal panel does not emit light on its own, the backlight module is needed to provide a desired surface light source.

In general, the back light module is categorized into a direct-type backlight module and a side-type backlight module. Using the side-type backlight module as an example, the side-type backlight module generally includes a light guide plate, a light source located beside a light incident surface of the light guide plate, and an optical film located on a light emitting surface of the light guide plate. Through the principle of total reflection, a light beam emitted by the light source is guided into the entire light guide plate after entering the light guide plate from the light incident surface. In the current technique, a plurality of microstructures is disposed on a bottom surface and the light emitting surface of the light guide plate to destroy the total reflection of light beam such that the light beam is emitted from the light emitting surface of the light guide plate. The light beam emitted from the light emitting surface further passes through the optical film located above the light guide plate and forms the surface light source needed for the display panel.

In the current technique, a sandblasting process is mainly used for the microstructures located on the light emitting surface of the light guide plate. Since the design parameters of the microstructures such as dimension, shape, and distribution cannot be effectively controlled in the sandblasting process, the light beam emitted from the light guide plate has the issue of low directivity. Moreover, when the light guide plate and a prism sheet are used together, since the light beam emitted from the light guide plate and the prism sheet are poorly matched in terms of angle, the prism sheet cannot effectively make the light beam from the light guide plate be emitted perpendicularly to the light emitting surface. As a result, the overall light utilization efficiency and luminance of the backlight module are reduced. Moreover, the sandblasting process readily causes the generation of bright spots. The various issues above make it difficult to improve the overall optical quality of the backlight module. Therefore, how to solve the issues above is one focus of concern for those skilled in the art.

Taiwan Patent No. 1375822, M264503, 1296694, M264504, and 1301920 and Taiwan Patent Publication No. 201344307 respectively disclose various microstructure designs of the light guide plate for destroying the total reflection of light beam and improving light utilization efficiency.

SUMMARY OF THE INVENTION

The invention provides a backlight module. The backlight module can effectively improve light utilization efficiency and luminance when a light guide plate and a prism sheet are used together.

Other objects and advantages of the invention can be further understood from the technical features disclosed in the invention.

To achieve at least one of the objects above or other objects, an embodiment of the invention provides a backlight module including a light guide plate, a reverse prism sheet, and a first light source. The light guide plate has a bottom surface, a light emitting surface, a first light incident surface, and a plurality of microstructures. The bottom surface and the light emitting surface are opposite to each other, and the first light incident surface is connected to the bottom surface and the light emitting surface. Each of the microstructures recesses into or protrudes from the bottom surface, and each of the microstructures has a first surface and a second surface. The first surface and the second surface of at least one of the microstructures are located on two sides of a first reference plane parallel to the first light incident surface, wherein the section-line of each of the first surfaces on the second reference plane perpendicular to the first light incident surface and perpendicular to the light emitting surface is a straight line. A first angle included between each of the first surfaces and a third reference plane parallel to the light emitting surface in the light guide plate is between 0 degrees and 20 degrees, and a thickness of each of the microstructures in a direction perpendicular to the light emitting surface is between 0 micrometers and 20 micrometers. The reverse prism sheet is located on the light emitting surface. The first light source is located adjacent to the first light incident surface.

In an embodiment of the invention, the first surface of each of the microstructures recessed into the bottom surface is located between the first light incident surface and the second surface, and the second surface of each of the microstructures protruded from the bottom surface is located between the first light incident surface and the first surface.

In an embodiment of the invention, a length of each of the microstructures in a direction perpendicular to the first light incident surface is between 0 micrometers and 500 micrometers, and a width of each of the microstructures in a direction parallel to the first light incident surface and parallel to the light emitting surface is between 0 micrometers and 500 micrometers.

In an embodiment of the invention, a section-line of each of the first surface and the second surface of at least one of the microstructures on the first reference plane is a curved line.

In an embodiment of the invention, a section-line of the second surface on the second reference plane is a straight line or a curved line.

In an embodiment of the invention, the second surface and the first surface of each of the microstructures are asymmetrical to each other.

In an embodiment of the invention, a second angle included between each of the second surfaces and the third reference plane in the light guide plate is between 0 degrees and 90 degrees.

In an embodiment of the invention, dimensions of the microstructures are increased from the first light incident surface toward a direction away from the first light incident surface.

In an embodiment of the invention, intervals between two adjacent microstructures are decreased from the first light incident surface toward a direction away from the first light incident surface.

In an embodiment of the invention, the light guide plate further includes a second light incident surface. The second light incident surface and the first light incident surface are opposite to each other and the second light incident surface is connected to the bottom surface and the light emitting surface. The backlight module further includes a second light source located adjacent to the second light incident surface.

In an embodiment of the invention, the second surface and the first surface of each of the microstructures are symmetrical to each other, and a second angle included between each of the second surfaces and the third reference plane in the light guide plate is between 0 degrees and 20 degrees.

In an embodiment of the invention, the first surface and the second surface of each of the microstructures respectively include a plurality of flat surfaces connected in pairs.

In an embodiment of the invention, a shape of the microstructures relatively adjacent to the first light incident surface and a shape of the microstructures relatively adjacent to the second light incident surface are symmetrical to each other.

In an embodiment of the invention, the first surface and the second surface of each of the microstructures are connected to each other.

In an embodiment of the invention, each of the microstructures further has a connecting surface. The connecting surface is connected to the first surface and the second surface, a section-line of the connecting surface on the second reference plane is a straight line or a curved line, and a section-line of the connecting surface on the first reference plane is a polyline or a curved line.

In an embodiment of the invention, a length of the connecting surface in a direction perpendicular to the first light incident surface is between 0 micrometers and 20 micrometers.

In an embodiment of the invention, the light guide plate further includes a lenticular lens structure located on the light emitting surface. The lenticular lens structure has a plurality of lenticular lenses parallel to one another, wherein a longitudinal direction of the lenticular lenses is perpendicular to the first light incident surface, and each of the lenticular lenses protrudes toward the reverse prism sheet.

In an embodiment of the invention, the backlight module further includes an optical film, wherein the reverse prism sheet is located between the light guide plate and the optical film, and the optical film is a dual brightness enhancement film (DBEF) or a diffusion sheet.

In an embodiment of the invention, the first surface and the second surface of each of the microstructures are respectively a curved surface.

In an embodiment of the invention, the first angles of the microstructures are all the same.

In an embodiment of the invention, a section-line of each of the first surfaces and each of the second surfaces on the first reference plane is a polyline.

In an embodiment of the invention, a section-line of each of the first surfaces and each of the second surfaces on the third reference plane is a curved line.

In an embodiment of the invention, a section-line of each of the first surfaces and each of the second surfaces on the third reference plane is a polyline.

Based on the above, the backlight modules of the embodiments of the invention improve the directivity of the light beam and angularly match the microstructures and the prism sheet through the design of the first surface of the microstructures. In this way, the prism sheet can effectively make the light beam from the light guide plate be emitted perpendicularly to the light emitting surface, such that the overall light utilization efficiency and luminance of the backlight module can be effectively improved. Moreover, the dimensions of each of the microstructures are designed by adjusting the thickness of each of the microstructures in a direction perpendicular to the light emitting surface. In addition to reducing the visibility of the microstructures, the overall optical quality and diversity of regional brightness modulation of the backlight module can also be improved.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
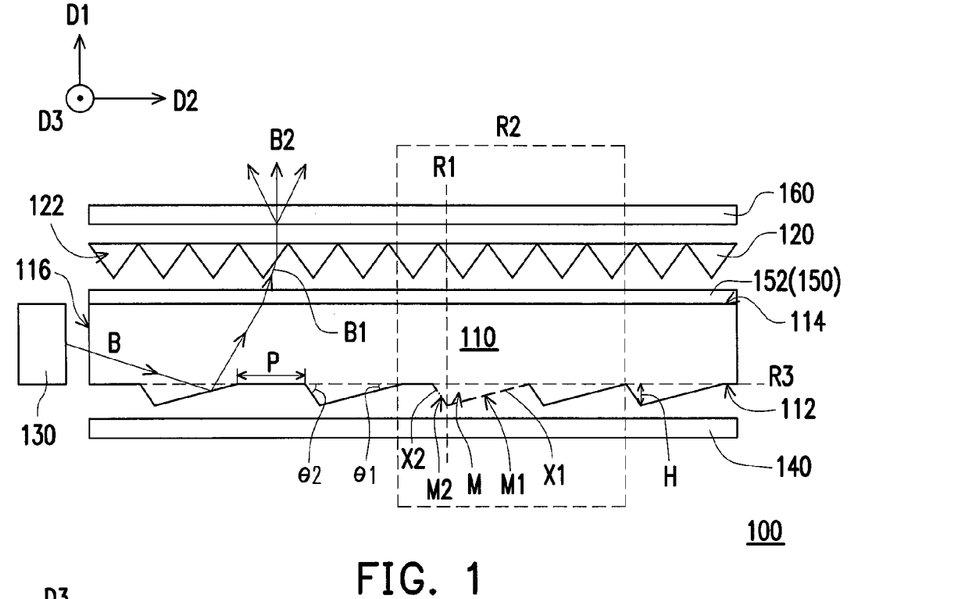
FIG. 1 is a cross-sectional schematic view of a backlight module according to the first embodiment of the invention.
Figure 2A:
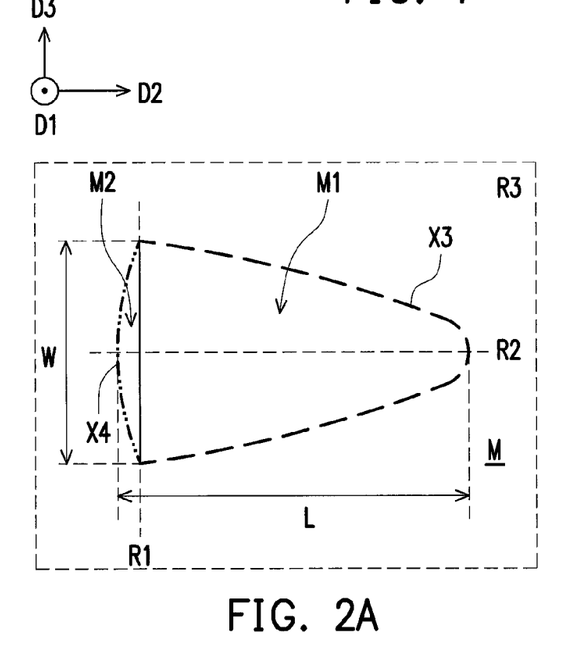
FIG. 2A is a top schematic view of a microstructure in FIG. 1.
Figure 2B:
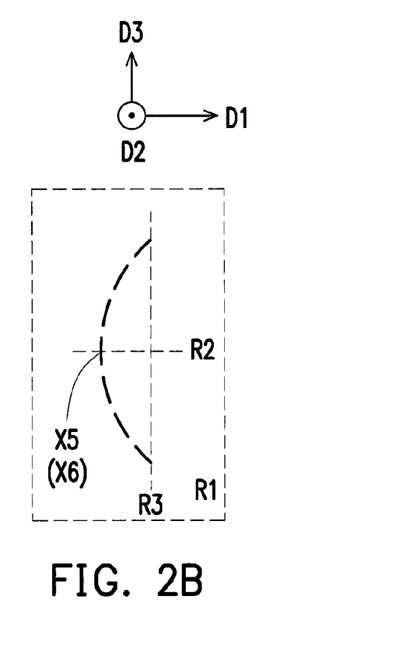
FIG. 2B is a cross-sectional schematic view of a microstructure on a first reference plane in FIG. 1.

FIG. 1 is a cross-sectional schematic view of a backlight module on a second reference plane R2 according to the first embodiment of the invention. FIG. 2A is a top schematic view of a microstructure in FIG. 1. FIG. 2B is a cross-sectional schematic view of a microstructure on a first reference plane R1 in FIG. 1. Referring to FIG. 1, FIG. 2A, and FIG. 2B, a backlight module 100 includes a light guide plate 110, a reverse prism sheet 120, and a first light source 130. The light guide plate 110 has a bottom surface 112, a light emitting surface 114, a first light incident surface 116, and a plurality of microstructures M. The bottom surface 112 and the light emitting surface 114 are opposite to each other and are, for instance, parallel to each other, and the first light incident surface 116 is connected to the bottom surface 112 and the light emitting surface 114. The reverse prism sheet 120 is located on the light emitting surface 114, the first light source 130 is located adjacent to the first light incident surface 116, and the first light source 130 is used to emit a light beam B toward the first light incident surface 116.

Each of the microstructures M has a first surface M1 and a second surface M2, wherein the first surface M1 and the second surface M2 are located on two sides of the first reference plane R1 parallel to the first light incident surface 116. In the embodiment, the second surface M2 of each of the microstructures M is located between the first light incident surface 116 and the first surface M1. Moreover, in each of the microstructures M, the first surface M1 is connected to the second surface M2. That is, the first surface M1 and the second surface M2 of each of the microstructures M are connected to each other. However, the invention is not limited thereto.

As shown in FIG. 1, section-lines X1 and X2 of each of the first surfaces M1 and each of the second surfaces M2 on the second reference plane R2 perpendicular to the first light incident surface 116 and perpendicular to the light emitting surface 114 are respectively a straight line. Moreover, as shown in FIG. 2A, section-lines X3 and X4 of each of the first surfaces M1 and each of the second surfaces M2 on a third reference plane R3 parallel to the light emitting surface 114 are respectively a curved line. Moreover, as shown in FIG. 2B, section-lines X5 and X6 (section-lines X5 and X6 are completely overlapped) of each of the first surfaces M1 and each of the second surfaces M2 on the first reference plane R1 are respectively a curved line. In other words, the first surface M1 and the second surface M2 of each of the microstructures M are respectively a curved surface. However, the invention is not limited thereto. In other embodiments, the section-line X2 of the second surface M2 on the second reference plane R2 can also be a curved line. Moreover, the section-lines X5 and X6 of each of the first surfaces M1 and each of the second surfaces M2 on the first reference plane R1 can both be a curved line or both be a polyline. Moreover, the section-lines X3 and X4 of each of the first surfaces M1 and each of the second surfaces M2 on the third reference plane R3 can both be a curved line or both be a polyline.

By making the section-line X1 of each of the first surfaces M1 on the second reference plane R2 perpendicular to the first light incident surface 116 and perpendicular to the light emitting surface 114 a straight line, the directivity of the light beam B can be improved such that the light beam B emitted into the light guide plate 110 from the first light incident surface 116 can be transmitted toward the light emitting surface 114 at a specific angle after being reflected by the first surface M1. The specific angle is defined by a first angle θ1 included between each of the first surfaces M1 and the third reference plane R3 in the light guide plate 110. In the embodiment, the first angle θ1 is designed to be between 0 degrees and 20 degrees such that the microstructures M and the reverse prism sheet 120 are angularly matched. In particular, a vertex angle of the reverse prism sheet 120 is, for instance, 60 to 70 degrees so as to improve a forward light emitting rate of a light beam B2. Specifically, through the design of the angle above, an angle included between the light beam B1 emitted from the light emitting surface 114 and a direction D1 perpendicular to the light emitting surface 114 can be 60 to 80 degrees. In this way, the reverse prism sheet 120 can effectively make the light beam B1 from the light guide plate 110 be emitted perpendicularly to the light emitting surface 114, such that the overall light utilization efficiency and luminance of the backlight module 100 can be effectively improved.

In the embodiment, the angle of the light beam B1 emitted from the light emitting surface 114 is mainly controlled through the design of the microstructures M. As a result, the light emitting surface 114 of the light guide plate 110 can be a flat surface. In other words, in comparison to the current light guide plate process, the step of forming the microstructures on the light emitting surface can be omitted for the light emitting surface 114 of the light guide plate 110 of the embodiment. Moreover, the microstructures M can be fabricated through a method of precision processing such as fast tool servo (FTS), exposure and development, or other suitable methods. Therefore, the surface roughness of the first surface M1 and the second surface M2 of the microstructures M can be reduced. As a result, the degree of diffusion of the light beam B on the first surface M1 and the second surface M2 can be reduced, thereby improving the overall optical efficiency of the backlight module 100.

The thickness of each of the microstructures M in the direction D1 perpendicular to the light emitting surface 114 and the size of a length L of each of the microstructures M in a direction D2 perpendicular to the first light incident surface 116 are controlled at the same time. For instance, when a thickness H of each of the microstructures M is between 0 micrometers and 20 micrometers, the length L of each of the microstructures M is between 0 micrometers and 500 micrometers. Moreover, according to different design requirements, a width W of each of the microstructures M in a direction D3 parallel to the first light incident surface 116 and parallel to the light emitting surface 114 is between 0 micrometers and 500 micrometers. In other words, the ratio of the length L and the width W of each of the microstructures M can be greater, less than, or equal to 1. The ratio is determined according to design requirements. In the embodiment, for the design parameters of each of the microstructures M, the length L is, for instance, less than 100 micrometers and greater than 0 micrometers, the width W is, for instance, less than 100 micrometers and greater than 0 micrometers, the thickness H is, for instance, less than 10 micrometers and greater than 0 micrometers, and the first angle θ1 is, for instance, between 0 degrees and 10 degrees. Moreover, as shown in FIG. 2A, when viewed from the direction D1 perpendicular to the bottom surface 112 (viewed from the top or bottom), the shape of the first surface M1 of each of the microstructures M is, for instance, a bell shape, and the shape of the second surface M2 of each of the microstructures M is, for instance, a bow shape. However, the invention is not limited thereto.

By suitably adjusting the thickness H of each of the microstructures M, in addition to reducing the visibility of the microstructures M, the degree of modulability of the microstructures M in distribution location and distribution density can also be improved. As a result, the overall optical quality and diversity of regional brightness modulation of the backlight module 100 can be improved.

The method of modulating the regional brightness includes, for instance, changing the interval between two adjacent microstructures M. As shown in FIG. 1, under the design architecture in which the first angles θ1 of the microstructures M are all the same and the dimensions of the microstructures M are all the same, intervals P between two adjacent microstructures M can be decreased from the first light incident surface 116 in a direction away from the first light incident surface 116 (i.e., direction D2). However, the invention is not limited thereto. In another embodiment, under the design architecture in which the first angles θ1 are all the same and the intervals P between two adjacent microstructures M are decreased from the first light incident surface 116 in a direction away from the first light incident surface 116, the dimensions of the microstructures M can also be increased from the first light incident surface 116 in a direction away from the first light incident surface 116. In yet another embodiment, the regional brightness can also be modulated by changing the first angle θ1 of the microstructures M, such as by making the first angles θ1 of the microstructures M different according to distribution location.

The reverse prism sheet 120 has a plurality of triangular lenticular prisms 122 parallel to one another, wherein a longitudinal direction of the triangular lenticular prisms 122 is perpendicular to the second reference plane R2 (i.e., parallel to the direction D3) and each of the triangular lenticular prisms 122 protrudes toward the light emitting surface 114. That is, the vertex of the reverse prism sheet 120 protrudes toward the light emitting surface 114. In the embodiment, the section-line of each of the triangular lenticular lenses 122 on the first reference plane R1 is a straight line and the section-line of each of the triangular lenticular lenses 122 on the second reference plane R2 is a polyline.

The first light source 130, for instance, includes a plurality of light-emitting diodes (only 1 is shown in FIG. 1), and the light-emitting diodes are arranged along the direction D3. Alternatively, the first light source 130 can also be a cold cathode fluorescent lamp (CCFL) (not shown in FIG. 1), and the extending direction of the CCFL is parallel to the direction D3.

Moreover, the backlight module 100 of the embodiment can selectively include at least one of a bottom reflective sheet 140, a lenticular lens structure 150, and an optical film 160 (all of the bottom reflective sheet 140, the lenticular lens structure 150, and the optical film 160 are shown in FIG. 1, but the invention is not limited thereto). The bottom reflective sheet 140 is located below the bottom surface 112 for reflecting the light beam passing out of the light guide plate 110 from the bottom surface 112 back into the light guide plate 110. As a result, light utilization efficiency is improved.

The lenticular lens structure 150 located on the light emitting surface 114 of the light guide plate 110 has a plurality of lenticular lenses 152 parallel to one another (only one lenticular lens 152 is shown in FIG. 1 due to cross-sectional direction), wherein a longitudinal direction of the lenticular lenses 152 is perpendicular to the first light incident surface 116. In the embodiment, the lenticular lenses 152 are arranged along the direction D3 and are respectively extended toward the direction D2.

Moreover, each of the lenticular lenses 152 protrudes toward the reverse prism sheet 120. In the embodiment, the section-line of each of the lenticular lenses 152 on the first reference plane R1 is a curved line and the section-line of each of the lenticular lenses 152 on the second reference plane R2 is a straight line. However, the invention is not limited thereto. In other embodiments, the section-line of each of the lenticular lenses 152 on the first reference plane R1 can be a polyline and the section-line of each of the lenticular lenses 152 on the second reference plane R2 is a straight line. The lenticular lens structure 150 is used to reduce the visibility of each of the microstructures M. When the dimensions of the microstructures M are small and the visibility is low, such as when the length L and the width W of each of the microstructures M are respectively less than 80 micrometers, the disposition of the lenticular lens structure 150 can be omitted.

The optical film 160 is located on the reverse prism sheet 120 and the reverse prism sheet 120 is located between the optical film 160 and the light guide plate 110. The optical film 160 can be a double brightness enhanced film (DBEF) such as Vikuiti™ Dual Brightness Enhancement Film-Embossed (DBEF-E) or Vikuiti™ Dual Brightness Enhancement Film II (DBEF-II) of 3M Company. The optical film 160 can also be a diffusion sheet. FIG. 1 is exemplified by a diffusion sheet capable of diffusing the light beam B1 from the reverse prism sheet 120. As a result, the light beam B2 emitted from the diffusion sheet has the effect of diffusion. In other words, the diffusion sheet is used to improve the uniformity of an exit light of the backlight module 100.

The current backlight module at least needs two diffusion sheets and two prism sheets to obtain the needed luminance and uniformity. In comparison, the backlight module 100 of the embodiment can be provided with only one diffusion sheet and one reverse prism sheet. In other words, the dispositions of at least one diffusion sheet and one prism sheet can be omitted for the backlight module 100 of the embodiment such that the backlight module 100 has a relatively thin overall thickness.

It should be mentioned that, FIG. 1, FIG. 2A, and FIG. 2B only schematically show one of the configurations of the microstructures, but the invention is not limited thereto. FIG. 3A, FIG. 4A, FIG. 5A, FIG. 6A, FIG. 7A, FIG. 8A, and FIG. 9A are respectively top schematic views of the second to eighth configurations of a microstructure according to the first embodiment of the invention. FIG. 3B, FIG. 4B, FIG. 5B, FIG. 6B, FIG. 7B, and FIG. 8B are respectively cross-sectional schematic views of the second to seventh configurations of a microstructure on the first reference plane R1 according to the first embodiment of the invention. FIG. 3C, FIG. 4C, FIG. 5C, FIG. 6C, FIG. 7C, and FIG. 8C are respectively cross-sectional schematic views of the second to seventh configurations of a microstructure on the second reference plane R2 according to the first embodiment of the invention. FIG. 9B is a cross-sectional schematic view of the eighth configuration of a first surface of a microstructure on the first reference plane R1 according to the first embodiment of the invention.

Figure 3A:
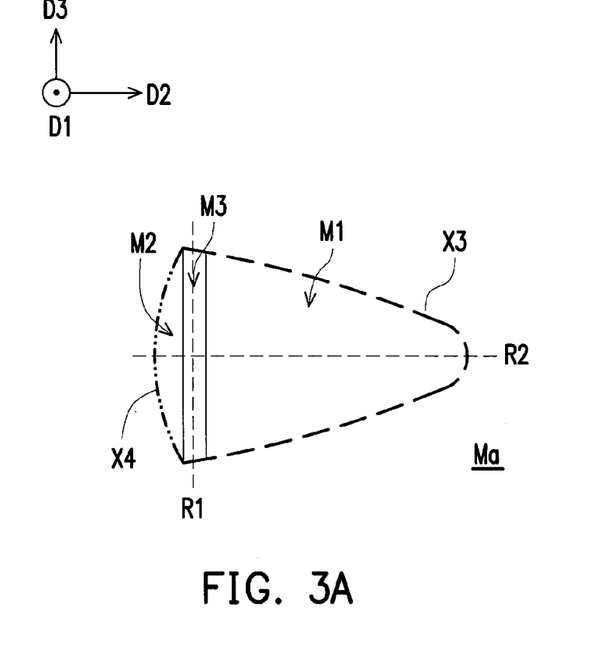
FIG. 3A, FIG. 4A, FIG. 5A, FIG. 6A, FIG. 7A, FIG. 8A, and FIG. 9A are respectively top schematic views of the second to eighth configurations of a microstructure according to the first embodiment of the invention.
Figure 3B:
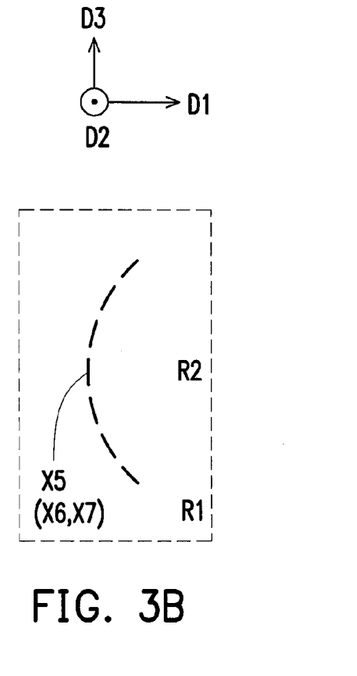
FIG. 3B, FIG. 4B, FIG. 5B, FIG. 6B, FIG. 7B, and FIG. 8B are respectively cross-sectional schematic views of the second to seventh configurations of a microstructure on the first reference plane according to the first embodiment of the invention.
Figure 3C:
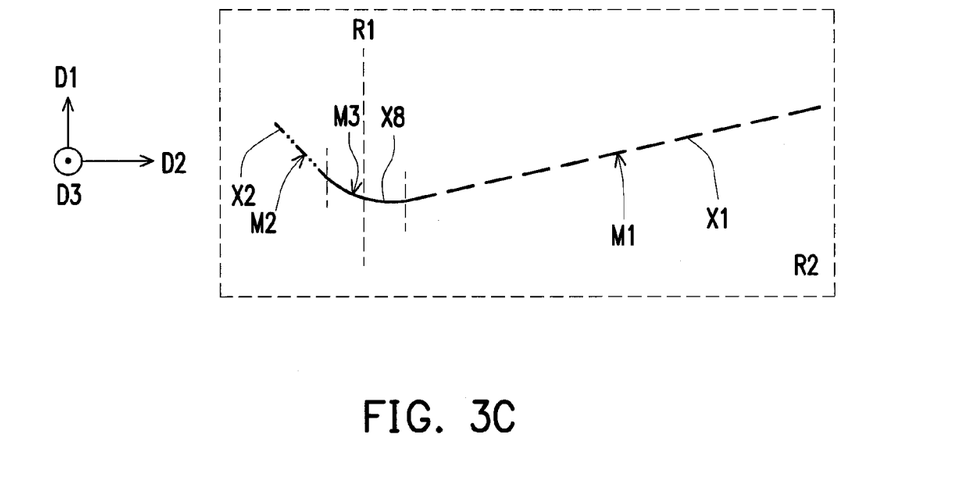
FIG. 3C, FIG. 4C, FIG. 5C, FIG. 6C, FIG. 7C, and FIG. 8C are respectively cross-sectional schematic views of the second to seventh configurations of a microstructure on a second reference plane according to the first embodiment of the invention.

Referring to FIG. 3A to FIG. 3C, the dimension design of microstructures Ma of the embodiment is substantially the same as the dimension design of the microstructures M of FIG. 2A. Moreover, the same contents are as shown in FIG. 2A and described in the corresponding descriptions and are not repeated herein. The main difference between the microstructures Ma and the microstructures M is that, the microstructures Ma further include a connecting surface M3, wherein the connecting surface M3 is connected to the first surface M1 and the second surface M2. Moreover, section-lines X7 and X8 of the connecting surface M3 on the first reference plane R1 and the second reference plane R2 are respectively a curved line. However, the invention is not limited thereto. In other embodiments, the section-line X7 of the connecting surface M3 on the first reference plane R1 is a polyline or a curved line and the section-line X8 of the connecting surface M3 on the second reference plane R2 is a straight line or a curved line. Moreover, the length of the connecting surface M3 in the direction D2 perpendicular to the first light incident surface 116 is, for instance, between 0 micrometers and 20 micrometers. However, the invention is not limited thereto.

Figure 4A:
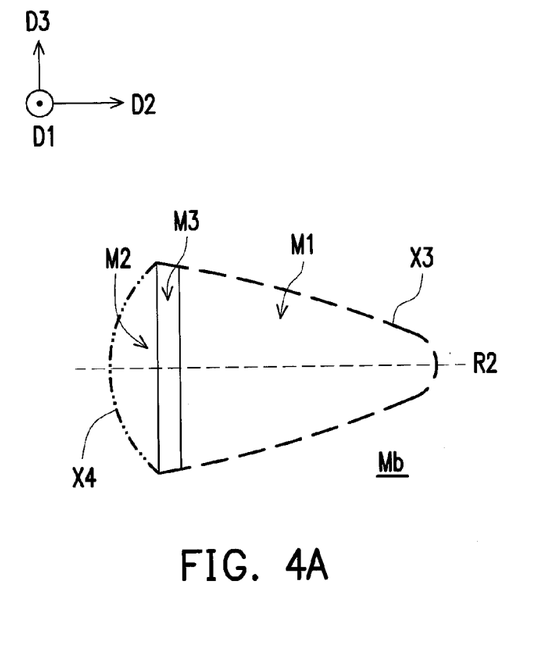
Figure 4B:
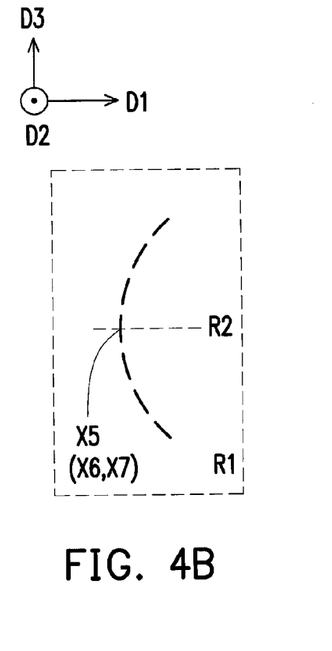
Figure 4C:
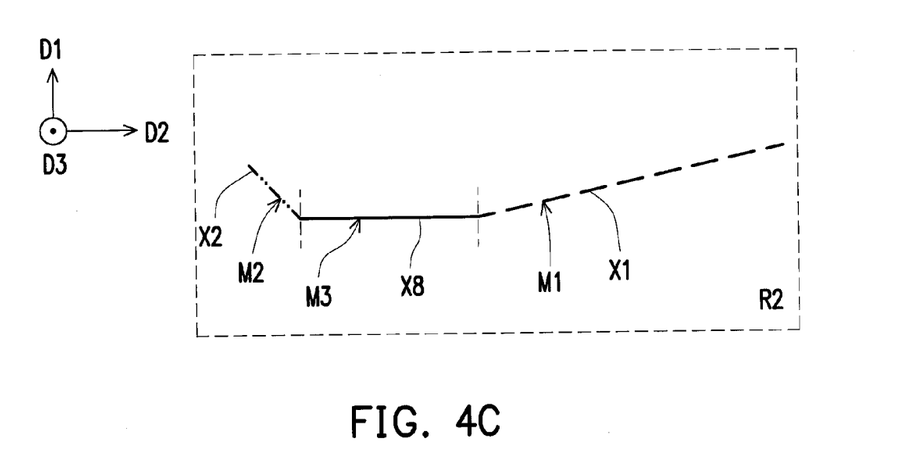
Figure 5A:
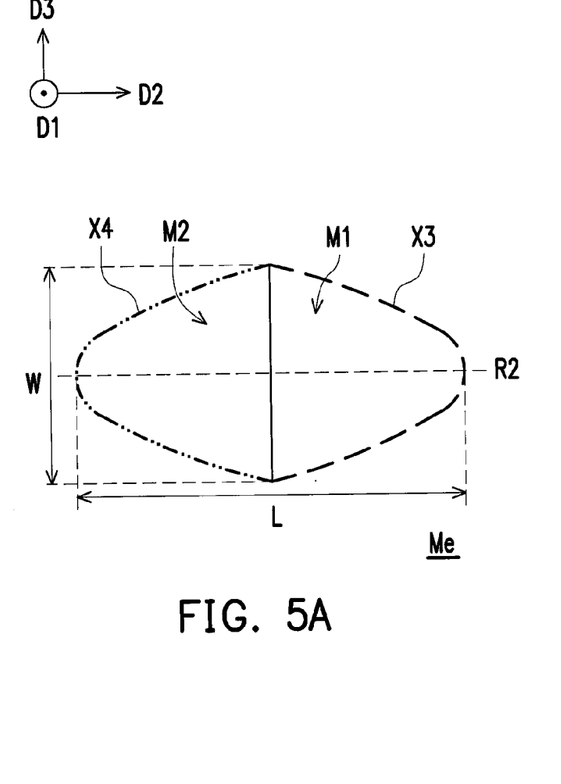
Figure 5B:
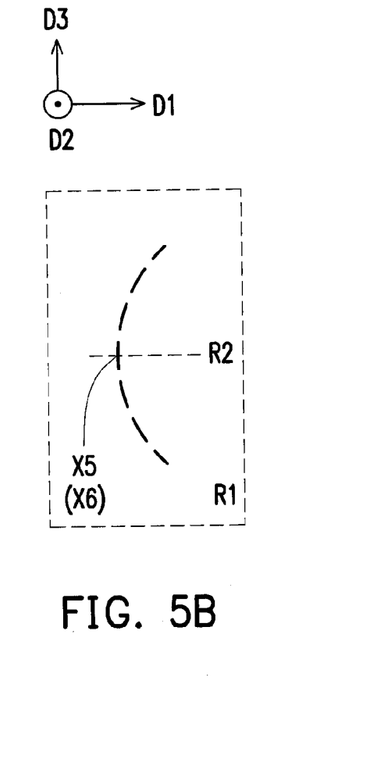
Figure 5C:
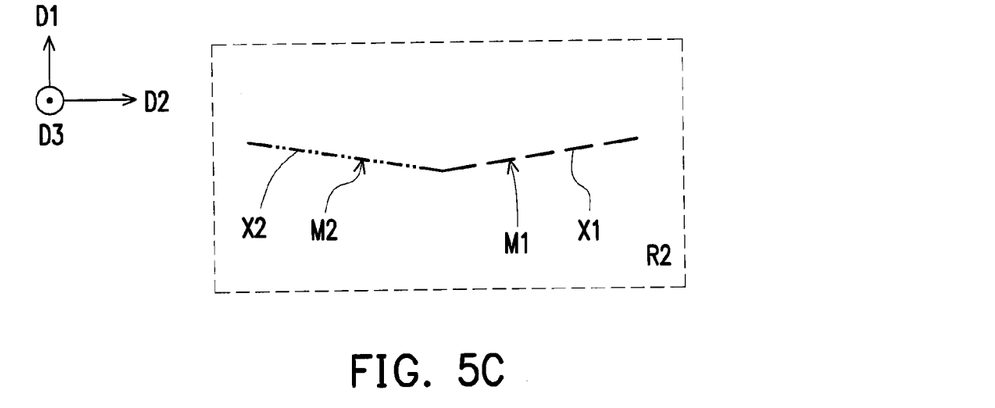
Figure 6A:
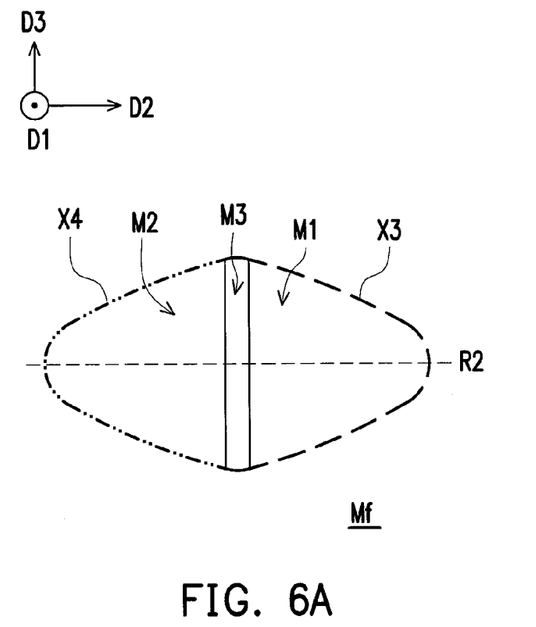
Figure 6B:
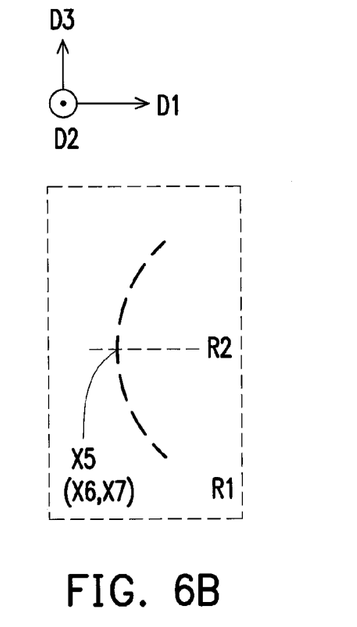
Figure 6C:
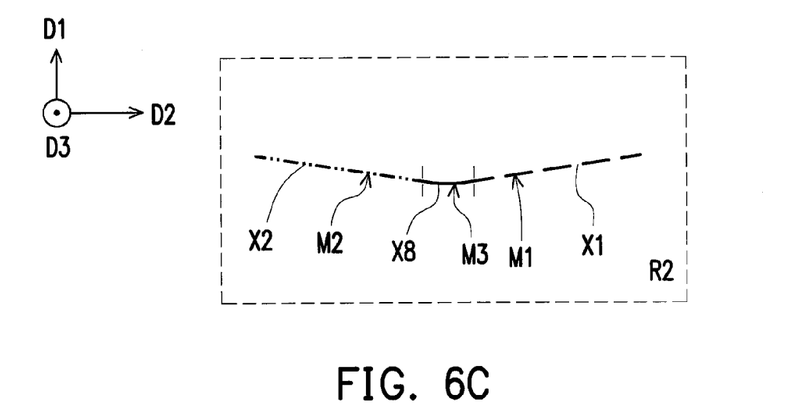
Figure 7A:
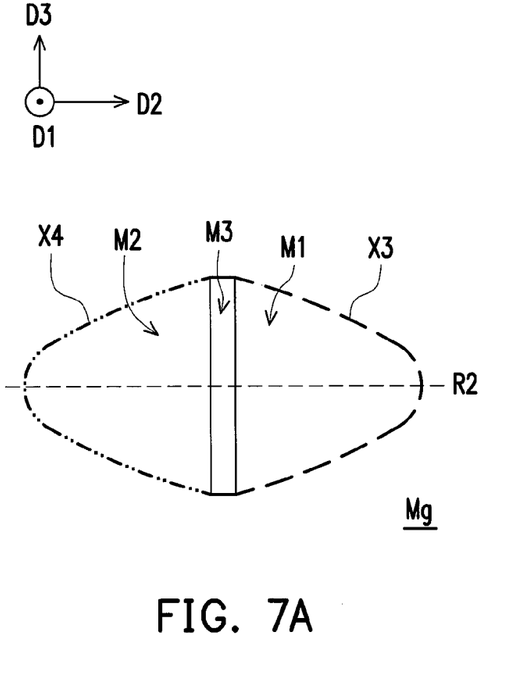
Figure 7B:
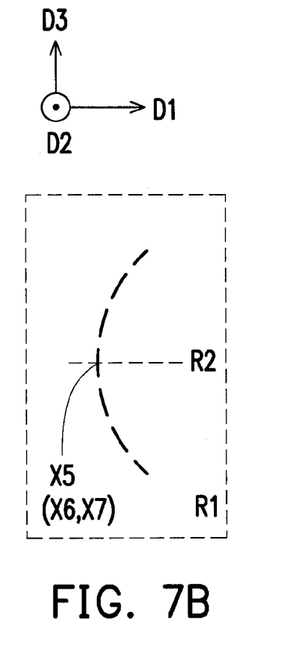
Figure 7C:
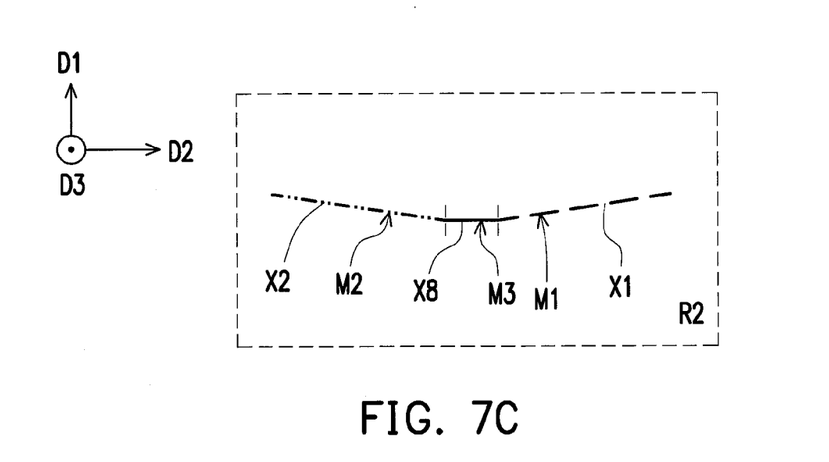

Referring to FIG. 4A to FIG. 4C, microstructures Mb of the embodiment are substantially the same as the microstructures Ma of FIG. 3A, and the dimension design thereof is as shown for the dimension design of the microstructures M of FIG. 2A and is not repeated herein. The main difference between the microstructures Mb and the microstructures Ma is that, the section-line X8 of the connecting surface M3 of the microstructures Mb on the second reference plane R2 is a straight line.

Figure 9A:
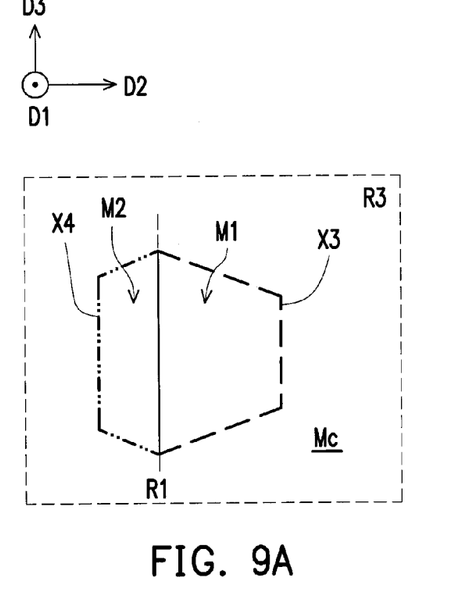

Referring to FIG. 9A to FIG. 9B, the dimension design of microstructures Mc of the embodiment is substantially the same as the dimension design of the microstructures M of FIG. 2A. Moreover, the same contents are as shown in FIG. 2A and described in the corresponding descriptions and are not repeated herein. The main difference between the microstructures Mc and the microstructures M is that, the section-lines X3 and X4 of the first surface M1 and the second surface M2 of the microstructures Mc on the third reference plane R3 are polylines, and the section-lines X5 and X6 of the first surface M1 and the second surface M2 of the microstructures Mc on the first reference plane R1 are polylines. Moreover, when viewed from the direction D1 perpendicular to the bottom surface 112 (refer to FIG. 1), the shape of the first surface M1 of the microstructures Mc is, for instance, a trapezoidal shape, and the shape of the second surface M2 is, for instance, a trapezoidal shape. Moreover, in other embodiments, the microstructures Mc can also have the connecting surface M3, and the connecting surface M3 is connected to the first surface M1 and the second surface M2.

Under the design architecture in which the backlight module receives light from one side, as shown in FIG. 2A, FIG. 3A, FIG. 4A, and FIG. 9A, the second surface M2 and the first surface M1 of each of the microstructures M, Ma, Mb, and Mc can be asymmetrical to each other. Moreover, a second angle θ2 (as shown in FIG. 1) included between each of the second surfaces M2 and the third reference plane R3 in the light guide plate 110 can be between 0 degrees and 90 degrees. However, the configuration of the microstructures of the invention is not limited thereto. Referring to FIG. 5A to FIG. 5C, FIG. 6A to FIG. 6C, and FIG. 7A to FIG. 7C, microstructures Me, Mf, and Mg are substantially the same as the microstructures M, Ma, and Mb. Moreover, the dimension designs of the microstructures Me, Mf, and Mg are as shown in FIG. 2A and described in the corresponding descriptions and are not repeated herein. The main difference between the microstructures Me, Mf, and Mg and the microstructures M, Ma, and Mb is that, the second surface M2 and the first surface M1 of the microstructures Me, Mf, and Mg are symmetrical to each other. Moreover, the second angle θ2 (as shown in FIG. 1) included between each of the second surfaces M2 and the third reference plane R3 in the light guide plate 110 is between 0 degrees and 20 degrees. Moreover, when viewed from the direction D1 perpendicular to the bottom surface 112 (refer to FIG. 1), the shape of each of the first surface M1 and the second surface M2 of each of the microstructures Me, Mf, and Mg is, for instance, a bell shape. Moreover, the main difference between the microstructures Mg and the microstructures Mf is that, the section-line X8 of the connecting surface M3 of the microstructures Mg on the second reference plane R2 is a straight line, and the section-line X8 of the connecting surface M3 of the microstructures Mf on the second reference plane R2 is a curved line.

Figure 8A:
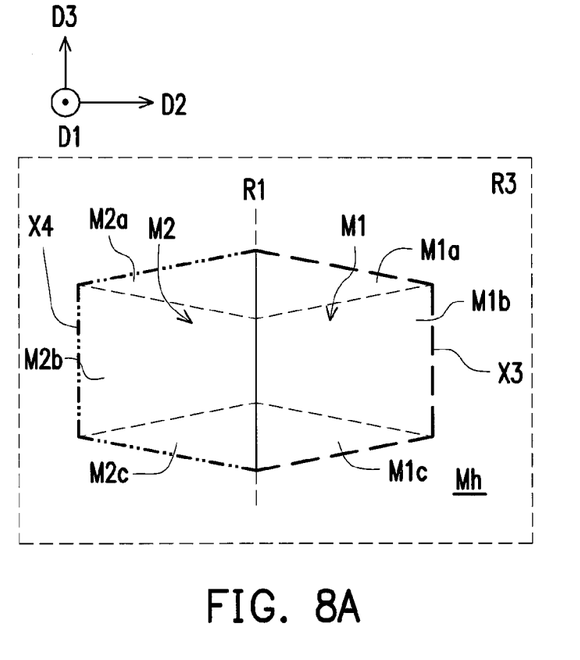
Figure 8B:
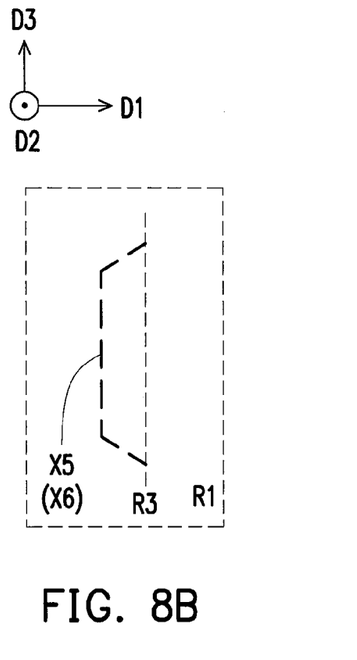
Figure 8C:
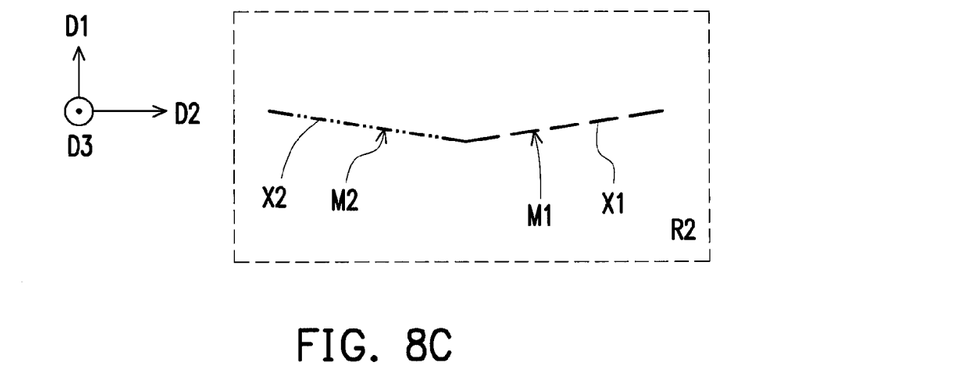
Figure 9B:
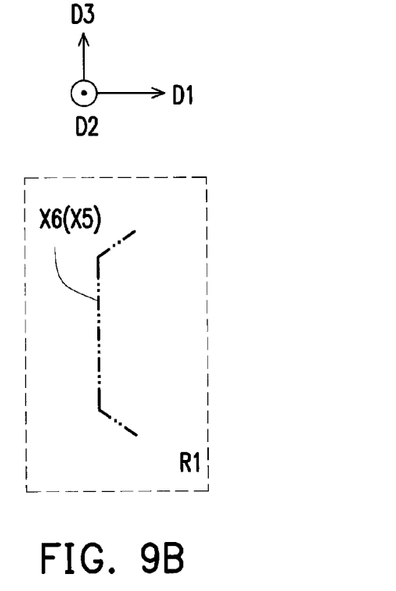
FIG. 9B is a cross-sectional schematic view of the eighth configuration of a first surface of a microstructure on the first reference plane according to the first embodiment of the invention.

Referring to FIG. 8A to FIG. 8C, microstructures Mh are substantially the same as the microstructures Me, and the dimension design thereof is as shown in FIG. 2A and described in the corresponding descriptions and is not repeated herein. The main difference between the microstructures Mh and the microstructures Me is that, the first surface M1 and the second surface M2 of the microstructures Mh respectively include a plurality of flat surfaces connected in pairs. The embodiment is exemplified by three groups of flat surfaces connected in pairs (flat surface M1a and flat surface M2a are connected, flat surface M1b and flat surface M2b are connected, and flat surface M1c and flat surface M2c are connected). Moreover, the section-lines X3 and X4 of the first surface M1 and the second surface M2 on the third reference plane R3 are polylines, and the section-lines X5 and X6 of the first surface M1 and the second surface M2 on the first reference plane R1 are polylines. Moreover, when viewed from the direction D1 perpendicular to the bottom surface 112 (refer to FIG. 1), the shape of each of the first surface M1 and the second surface M2 of each of the microstructures Mh is, for instance, a trapezoidal shape.

Figure 10:
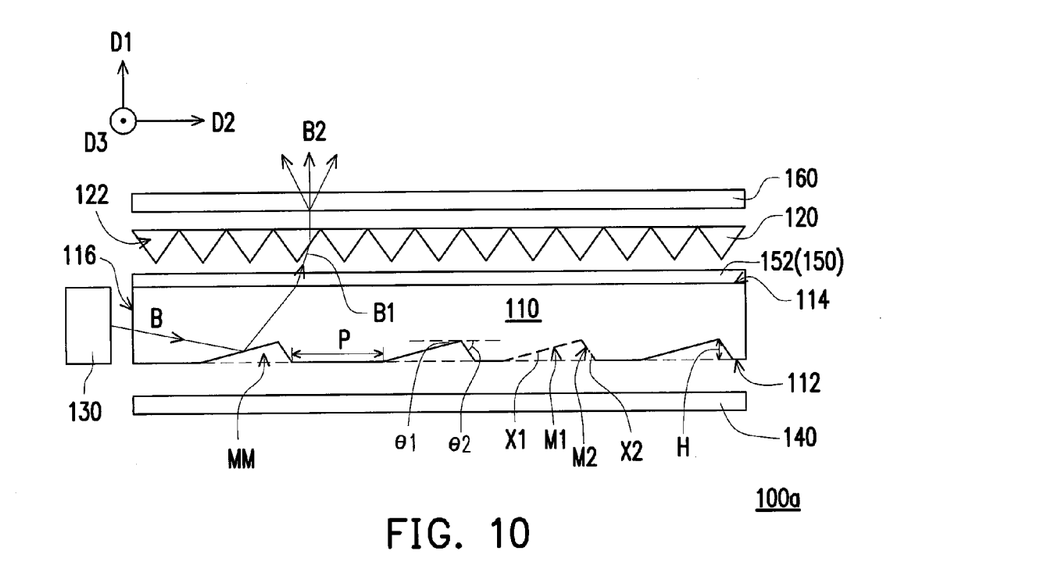
FIG. 10 to FIG. 13 are cross-sectional schematic views of four backlight modules according to the second to fifth embodiments of the invention.

Each of the microstructures M, Ma, Mb, Mc, Me, Mf, Mg, and Mh can protrude from the bottom surface 112 of the light guide plate 110 (as shown in FIG. 1). However, the invention is not limited thereto. FIG. 10 to FIG. 13 are cross-sectional schematic views of four backlight modules according to the second to fifth embodiments of the invention. Referring to FIG. 10, a backlight module 100a is substantially the same as the backlight module 100 of FIG. 1. In particular, the same elements are represented by the same reference numerals, and the relative disposition relationships, effects, and efficacies of the elements are not repeated herein. The difference between the backlight module 100a and the backlight module 100 is that, each of the microstructures MM of the embodiment recesses into the bottom surface 112, and the first surface M1 of each of the microstructures MM is located between the first light incident surface 116 and the second surface M2. In this way, the first surface M1 can guide most of the light beam B from the first light incident surface 116 to the light emitting surface 114 at a specific angle. In the embodiment of FIG. 10, the dimension designs of the microstructures M, Ma, Mb, Mc, Me, Mf, Mg, and Mh can be applied to each of the microstructures MM. However, the protruding design is changed to recessing design, and the relative locations of the first surface M1 and the second surface M2 are switched. Since the backlight module 100a of FIG. 10 receives light beam from one side, the dimension designs of M, Ma, Mb, and Mc are preferred for the backlight module 100a. However, the protruding design is changed to recessing design, and the relative locations of the first surface M1 and the second surface M2 are switched to increase the area ratio occupied by the first surface M1 in each of the microstructures MM. As a result, the backlight module 100a has better light utilization efficiency.

Figure 13:
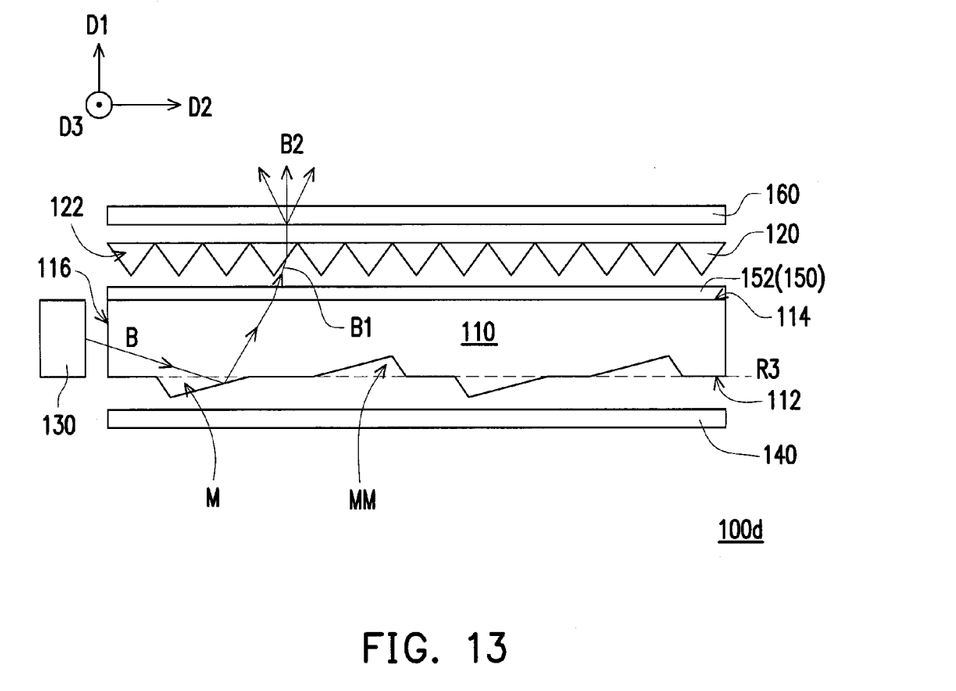

In other embodiments, referring to FIG. 13, a backlight module 100d is substantially the same as the backlight module 100 of FIG. 1 and the backlight module 100a of FIG. 10. In particular, the same elements are represented by the same reference numerals, and the relative disposition relationships, effects, and efficacies of the elements are not repeated herein. The bottom surface 112 of the light guide plate 110 can have the microstructures M protrude from the bottom surface 112 and the microstructures MM recess into the bottom surface 112 at the same time. In other embodiments, the bottom surface 112 of the light guide plate 110 can also have at least two of various microstructure designs (such as the microstructures M, Ma, Mb, Mc, Me, Mf, Mg, and Mh) at the same time or a combination of a plurality of designs, and the invention is not limited thereto.

Figure 11:
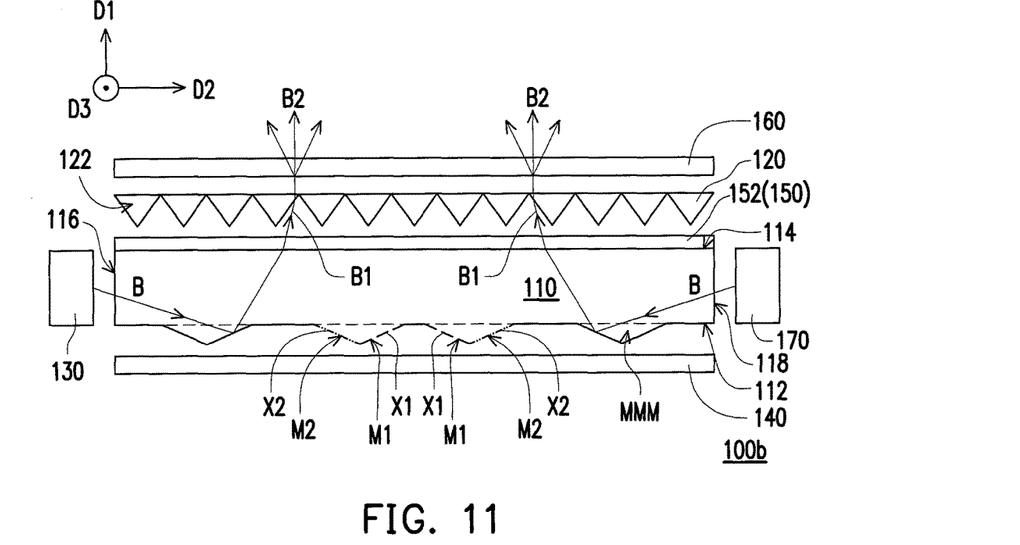

Referring to FIG. 11, a backlight module 100b is substantially the same as the backlight module 100 of FIG. 1. In particular, the same elements are represented by the same reference numerals, and the relative disposition relationships, effects, and efficacies of the elements are not repeated herein. The difference between the backlight module 100b and the backlight module 100 is that, the backlight module 100b further includes a second light source 170. Specifically, the light guide plate 110 further includes a second light incident surface 118, wherein the second light incident surface 118 and the first light incident surface 116 are opposite to each other and the second light incident surface 118 is connected to the bottom surface 112 and the light emitting surface 114. The second light source 170 is located adjacent to the second light incident surface 118. In other words, the backlight module 100b has the design architecture in which light beam is received from two sides.

In the embodiment, the microstructures Me, Mf, Mg, and Mh for which the second surface M2 and the first surface M1 are symmetrical to each other are applied to microstructures MMM such that the microstructures MMM have better optical efficiency. Specifically, under the design in which the second surface M2 and the first surface M1 are symmetrical to each other, the section-line of each of the first surface M1 and the second surface M2 on the second reference plane R2 is a straight line, and the first angle θ1 and the second angle θ2 are respectively between 0 degrees and 20 degrees, the first surface M1 and the second surface M2 can reflect the light beam B entering the light guide plate 110 to the light emitting surface 114 at a specific angle. As a result, the light beam B1 emitted from the light emitting surface 114 and the direction D1 perpendicular to the light emitting surface 114 form an angle of 60 to 80 degrees. In this way, the reverse prism sheet 120 can effectively make the light beam B1 from the light guide plate 110 be emitted perpendicularly to the light emitting surface 114, such that the overall light utilization efficiency and luminance of the backlight module 100b can be effectively improved. It should be mentioned that, in FIG. 11, although the microstructures MMM are shown to be protruding from the bottom surface 112, in another embodiment, the microstructures MMM can also be recessing into the bottom surface 112 as shown in FIG. 10. Alternatively, the light guide plate 110 has the microstructures MMM protrude from the bottom surface 112 and the microstructures MMM recess into the bottom surface 112 therein at the same time.

Figure 12:
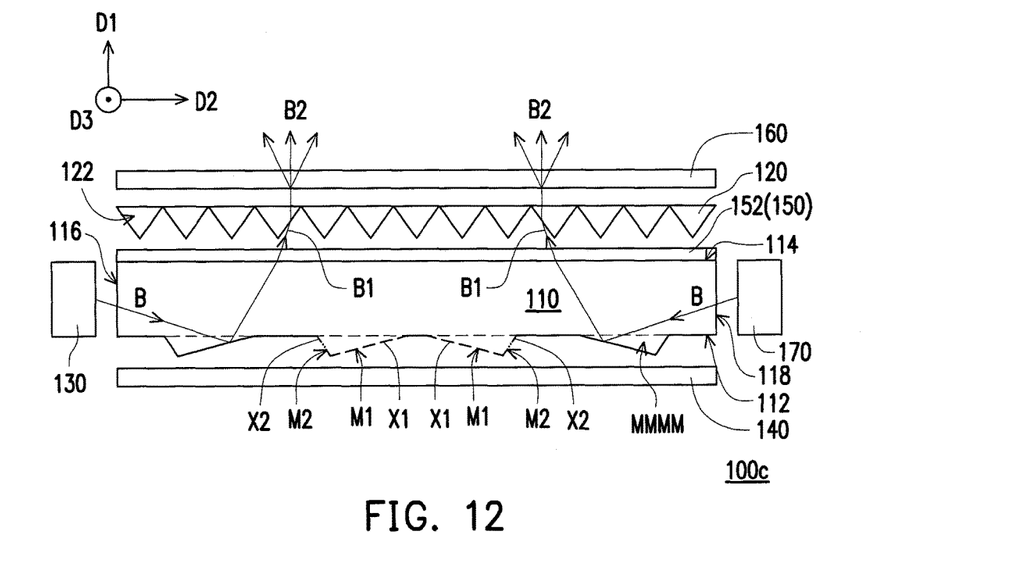

Referring to FIG. 12, a backlight module 100c is substantially the same as the backlight module 100b of FIG. 11. In particular, the same elements are represented by the same reference numerals, and the relative disposition relationships, effects, and efficacies of the elements are not repeated herein. The difference between the backlight module 100c and the backlight module 100b is that, the microstructures M, Ma, Mb, and Mc for which the second surface M2 and the first surface M1 are asymmetrical to each other are applied to microstructures MMMM of the backlight module 100c. Moreover, the shape of the microstructures MMMM relatively adjacent to the first light incident surface 116 and the shape of the microstructures MMMM relatively adjacent to the second light incident surface 118 are symmetrical to each other. Specifically, under the architecture in which the microstructures MMMM protrude from the bottom surface 112, the second surface M2 of the microstructures MMMM relatively adjacent to the first light incident surface 116 is located between the first surface M1 and the first light incident surface 116, and the second surface M2 of the microstructures MMMM relatively adjacent to the second light incident surface 118 is located between the first surface M1 and the second light incident surface 118. However, the invention is not limited thereto. In another embodiment, the microstructures MMMM can also be recessing into the bottom surface 112, the first surface M1 of the microstructures MMMM relatively adjacent to the first light incident surface 116 is located between the second surface M2 and the first light incident surface 116, and the first surface M1 of the microstructures MMMM relatively adjacent to the second light incident surface 118 is located between the second surface M2 and the second light incident surface 118. In other embodiments, the design in which the microstructures MMMM protrude from the bottom surface 112 and the design in which the microstructures MMMM recess into the bottom surface 112 can also be combined on the same light guide plate.

Based on the above, the embodiments of the invention can achieve at least one of the following advantages or efficacies. The backlight modules of the embodiments of the invention improve the directivity of the light beam and angularly match the microstructures and the prism sheet through the design of the first surface of the microstructures. In this way, the prism sheet can effectively make the light beam from the light guide plate be emitted perpendicularly to the light emitting surface, such that the overall light utilization efficiency and luminance of the backlight module can be effectively improved. Moreover, the dimensions of each of the microstructures are designed by adjusting the thickness of each of the microstructures in a direction perpendicular to the light emitting surface. In addition to reducing the visibility of the microstructures, the overall optical quality and diversity of regional brightness modulation of the backlight module can also be improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
a light guide plate having a bottom surface, a light emitting surface, a first light incident surface, and a plurality of microstructures, wherein the bottom surface and the light emitting surface are opposite to each other, the first light incident surface is connected to the bottom surface and the light emitting surface, each of the microstructures only protrudes from the bottom surface, each of the microstructures has a first surface and a second surface, the first surface and the second surface of at least one of the microstructures are located on two sides of a first reference plane parallel to the first light incident surface, wherein a section-line of each of the first surfaces on a second reference plane perpendicular to the first light incident surface and perpendicular to the light emitting surface is a straight line, a first angle included between each of the first surfaces and a third reference plane parallel to the light emitting surface in the light guide plate is between 0 degrees and 20 degrees, a section-line of each of the first surfaces and each of the second surfaces on the third reference plane is only a curved line, and a thickness of each of the microstructures in a direction perpendicular to the light emitting surface is between 0 micrometers and 20 micrometers;
a reverse prism sheet located on the light emitting surface; and
a first light source located adjacent to the first light incident surface.

2. The backlight module of claim 1, wherein the second surface of each of the microstructures protruded from the bottom surface is located between the first light incident surface and the first surface.

3. The backlight module of claim 1, wherein a length of each of the microstructures in a direction perpendicular to the first light incident surface is between 0 micrometers and 500 micrometers, and a width of each of the microstructures in a direction parallel to the first light incident surface and parallel to the light emitting surface is between 0 micrometers and 500 micrometers.

4. The backlight module of claim 1, wherein a section-line of each of the first surface and the second surface of at least one of the microstructures on the first reference plane is a curved line.

5. The backlight module of claim 1, wherein a section-line of the second surface on the second reference plane is a straight line or a curved line.

6. The backlight module of claim 1, wherein the second surface and the first surface of each of the microstructures are asymmetrical to each other.

7. The backlight module of claim 6, wherein a second angle included between each of the second surfaces and the third reference plane in the light guide plate is between 0 degrees and 90 degrees.

8. The backlight module of claim 1, wherein dimensions of the microstructures are increased from the first light incident surface toward a direction away from the first light incident surface.

9. The backlight module of claim 1, wherein intervals between two adjacent microstructures are decreased from the first light incident surface toward a direction away from the first light incident surface.

10. The backlight module of claim 1, wherein the light guide plate further comprises a second light incident surface, the second light incident surface and the first light incident surface are opposite to each other, the second light incident surface is connected to the bottom surface and the light emitting surface, and the backlight module further comprises a second light source located adjacent to the second light incident surface.

11. The backlight module of claim 10, wherein the second surface and the first surface of each of the microstructures are symmetrical to each other, and a second angle included between each of the second surfaces and the third reference plane in the light guide plate is between 0 degrees and 20 degrees.

12. The backlight module of claim 11, wherein the first surface and the second surface of each of the microstructures respectively comprise a plurality of flat surfaces connected in pairs.

13. The backlight module of claim 10, wherein a shape of the microstructures relatively adjacent to the first light incident surface and a shape of the microstructures relatively adjacent to the second light incident surface are symmetrical to each other.

14. The backlight module of claim 1, wherein the first surface and the second surface of each of the microstructures are connected to each other.

15. The backlight module of claim 1, wherein each of the microstructures further has a connecting surface, the connecting surface is connected to the first surface and the second surface, a section-line of the connecting surface on the second reference plane is a straight line or a curved line, and a section-line of the connecting surface on the first reference plane is a polyline or a curved line.

16. The backlight module of claim 15, wherein a length of the connecting surface in a direction perpendicular to the first light incident surface is between 0 micrometers and 20 micrometers.

17. The backlight module of claim 1, wherein the light guide plate further comprises a lenticular lens structure located on the light emitting surface, the lenticular lens structure has a plurality of lenticular lenses parallel to one another, wherein a longitudinal direction of the lenticular lenses is perpendicular to the first light incident surface, and each of the lenticular lenses protrudes toward the reverse prism sheet.

18. The backlight module of claim 1, further comprising an optical film, wherein the reverse prism sheet is located between the light guide plate and the optical film, and the optical film is a dual brightness enhancement film or a diffusion sheet.

19. The backlight module of claim 1, wherein the first surface and the second surface of each of the microstructures are respectively a curved surface.

20. The backlight module of claim 1, wherein the first angles of the microstructures are all the same.

21. The backlight module of claim 1, wherein a section-line of each of the first surfaces and each of the second surfaces on the first reference plane is a polyline.

* * * * *